United States Patent
Zwinger et al.

(10) Patent No.: US 7,549,070 B2
(45) Date of Patent: Jun. 16, 2009

(54) METHOD AND APPARATUS FOR GENERATING A DYNAMIC POWER-FLUX MAP FOR A SET OF COMPUTER SYSTEMS

(75) Inventors: Steven F. Zwinger, Poway, CA (US);
Kenny C. Gross, San Diego, CA (US);
Ramakrishna C. Dhanekula, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 558 days.

(21) Appl. No.: 11/479,542

(22) Filed: Jun. 30, 2006

(65) Prior Publication Data

US 2008/0004837 A1    Jan. 3, 2008

(51) Int. Cl.
*G06F 1/32*    (2006.01)
(52) U.S. Cl. .................. 713/320; 713/310; 340/501
(58) Field of Classification Search ............. 713/300, 713/310, 320; 340/501, 539.26
See application file for complete search history.

(56) References Cited

U.S. PATENT DOCUMENTS 7,194,337 B2 *   3/2007   Sharma et al. ............. 700/276

| | | | |
|---|---|---|---|
| 2005/0015632 A1 * | 1/2005 | Chheda et al. | 713/300 |
| 2006/0112286 A1 * | 5/2006 | Whalley et al. | 713/300 |
| 2007/0245161 A1 * | 10/2007 | Shaw et al. | 713/300 |

OTHER PUBLICATIONS

Sharma, R. K., Bash, C. E., Patel, C. D., Friedrich, R. J., Chase, J. S., "Balance of Power: Dynamic Thermal Management for Internet Data Centers", Jan.-Feb. 2005, IEEE Computer Society, pp. 42-49.*

* cited by examiner

*Primary Examiner*—Thuan N Du
(74) *Attorney, Agent, or Firm*—Park, Vaughan & Fleming LLP

(57) ABSTRACT

A system that generates a dynamic power-flux map for a set of computer systems. During operation the system determines the locations of the computer systems. Next, the system receives dynamic traces of power consumption for the computer systems, wherein a dynamic trace of power consumption for a given computer system is generated based on dynamic traces of monitored inferential variables for the given computer system. The system then correlates the locations of the computer systems with the dynamic traces of power consumption for the computer systems, and generates the dynamic power-flux map for the set of computer systems based on the correlated locations and the dynamic traces for the computer systems.

20 Claims, 7 Drawing Sheets

METHOD AND APPARATUS FOR GENERATING A DYNAMIC POWER-FLUX MAP FOR A SET OF COMPUTER SYSTEMS

RELATED APPLICATION

This application is related to a pending U.S. patent application, entitled "Real-Time Power Harness," by inventors Kenny C. Gross, Kalyanaraman Vaidyanathan, Aleksey M. Urmanov, Keith A. Whisnant, and Steven F. Zwinger, having Ser. No. 11/195,014 and a filing date of 2 Aug. 2005. This pending application is hereby incorporated by reference.

BACKGROUND

1. Field of the Invention

The present invention relates to techniques for determining power consumption for a set of computer systems. More specifically, the present invention relates to a method and apparatus for generating a dynamic power-flux map for a set of computer systems.

2. Related Art

Large businesses often maintain datacenters containing dozens or even hundreds of servers that provide various computational services. Since excessive heat can cause premature failure of components within servers, providing sufficient cooling capacity to remove the heat generated by these servers is a primary concern for operators of these datacenters.

At the present moment, large datacenters typically over-provision cooling capacity. More specifically, large datacenters provision cooling capacity by adding up the faceplate power ratings for each server in the datacenter and then providing sufficient cooling capacity to meet this estimated maximum level of power consumption. Typically, the faceplate power rating is higher than it is possible to achieve because the faceplate power ratings are extremely conservative estimates of the maximum theoretically possible power consumption of the individual components and the field-replaceable units (FRUs) within a server.

Note that the faceplate power rating is typically determined by adding up the power rating of each individual component and each FRU within the server. Therefore, the conservatively-high power rating estimates for these individual components and FRUs are reflected in the faceplate power rating.

Furthermore, average server utilization factors are low. As a result, datacenters are being designed to provide an amount of cooling capacity that matches a maximum theoretically possible power consumption, even though the actual cooling requirements may never exceed half of this maximum cooling capacity. Thus, it is desirable to more accurately measure the dynamic power consumption of servers to prevent needless and expensive over-provisioning of cooling systems for the servers.

One technique for measuring the dynamic power consumption of a server is to place a hardware power monitor between an external power supply and the server. Unfortunately, a hardware power monitor is expensive, typically costing many thousands of dollars. Furthermore, a hardware power monitor only measures the total power entering the server and hence cannot report on the power consumption of the individual components within the server.

A related challenge for datacenter operators is to balance the power flux and the temperature across a datacenter. Large disparities between "hot" and "cold" zones within a datacenter can result in cooling inefficiencies, which can significantly increase datacenter electricity costs. Furthermore, local "hot spots," caused by an aggregation of computer systems or racks, can lead to poor long-term reliability of the computer systems located within the local hot spot. A power-flux density map can be used to determine how to provision cooling within the datacenter and can be used to determine where to place computer systems within the datacenter to substantially balance the power flux across a datacenter. Note that a power-flux map plots power-flux density, typically expressed as a power density in kilowatts per square foot, against the physical position of the computer systems within the datacenter. Unfortunately, present techniques for generating a power-flux map for a datacenter are time-consuming and expensive.

One approach used by datacenter operators to generate a power-flux map is to use Computation Fluid Dynamics (CFD) techniques to assess the spatial heat distribution in the data center. Under these techniques, temperature sensors are placed throughout the datacenter to collect thermal data, which is then used in CFD computations to infer spatial thermal-flux densities. Note that only measuring the temperature is not sufficient because it does not account for the rate of cool air being vented into the room. For example, if a temperature sensor is placed near a cool air vent, the temperature in that area would be lower than a temperature sensor placed near a rack of servers. Hence, a CFD analysis can be used to account for the airflow characteristics within the datacenter. Note that the airflow characteristics can also include the airflow through the racks and the computer systems (i.e., the change in temperature of the air flowing through the computer system).

Unfortunately, this technique requires manually taking temperature measurements within the datacenter and the use of complex CFD analysis, which is time-consuming and expensive. Furthermore, a CFD analysis is a one-time snapshot of the power flux within the datacenter. This power-flux mapping can quickly become out-of-date if the load profiles of the computer systems within the datacenter change, or when computer systems are upgraded or reconfigured.

Another approach for generating a power-flux map uses a robot that travels along each aisle of the datacenter taking temperature measurements using a temperature sensor. The temperature data collected by the robot is then entered into complex CFD software that infers the thermal flux within the datacenter. Although the robot can be configured to automatically travel along each aisle to collect temperature readings, this technique still requires the use of complex CFD analysis and further requires an expensive robot.

Hence, what is needed is a method and an apparatus for generating a power-flux map within a datacenter without the problems described above.

SUMMARY

One embodiment of the present invention provides a system that generates a dynamic power-flux map for a set of computer systems. During operation the system determines the locations of the computer systems. Next, the system receives dynamic traces of power consumption for the computer systems, wherein a dynamic trace of power consumption for a given computer system is generated based on dynamic traces of monitored inferential variables for the given computer system. The system then correlates the locations of the computer systems with the dynamic traces of power consumption for the computer systems, and generates the dynamic power-flux map for the set of computer systems based on the correlated locations and the dynamic traces for the computer systems.

In a variation on this embodiment, the dynamic power-flux map is a three-dimensional map which contains two spatial dimensions which specify locations in a two-dimensional space, and a power density dimension which indicates the power flux at a two-dimensional location.

In a variation on this embodiment, the dynamic power-flux map is a four-dimensional map which contains three spatial dimensions which specify locations in a three-dimensional space, and a power density dimension which indicates the power flux at a three-dimensional location.

In a variation on this embodiment, while determining the location of a computer system, the system uses a radio frequency identity and geometry (RFIG) tag located on the computer system to automatically detect the location of the computer system.

In a variation on this embodiment, the computer systems are located within a datacenter.

In a further variation, the system repeats the following process until the power flux across the datacenter is substantially balanced. The system analyzes the dynamic power-flux map to determine whether imbalances exist in power flux across the datacenter. If imbalances exist, the system redistributes computer systems to substantially balance power flux across the datacenter and regenerates the dynamic power-flux map for the datacenter.

In a further variation, after the power flux across the datacenter is substantially balanced, if the temperature across the datacenter is not balanced, the system modifies physical attributes of the datacenter to substantially balance the temperature across the datacenter.

In a further variation, the physical attributes of the datacenter can include the number of air conditioning units in the data center, the location of air conditioning units in the data center, the cooling capacity of the air conditioning units in the data center, the location of perforated tiles which vent cool air into the datacenter, the location of racks which house the computer systems in the data center, and the air flow characteristics of the racks in the data center.

In a variation on this embodiment, the inferential variables include signals from current sensors and voltage sensors located within the computer systems.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Power Harness

The present invention continuously monitors a variety of instrumentation signals in real-time during operation of a computer system. (Note that although we refer to a single computer system in this disclosure, the present invention also applies to a collection of computer systems).

These instrumentation signals can include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include "physical parameters" such as distributed internal temperatures, environmental variables, currents, and voltages.

Figure 1:
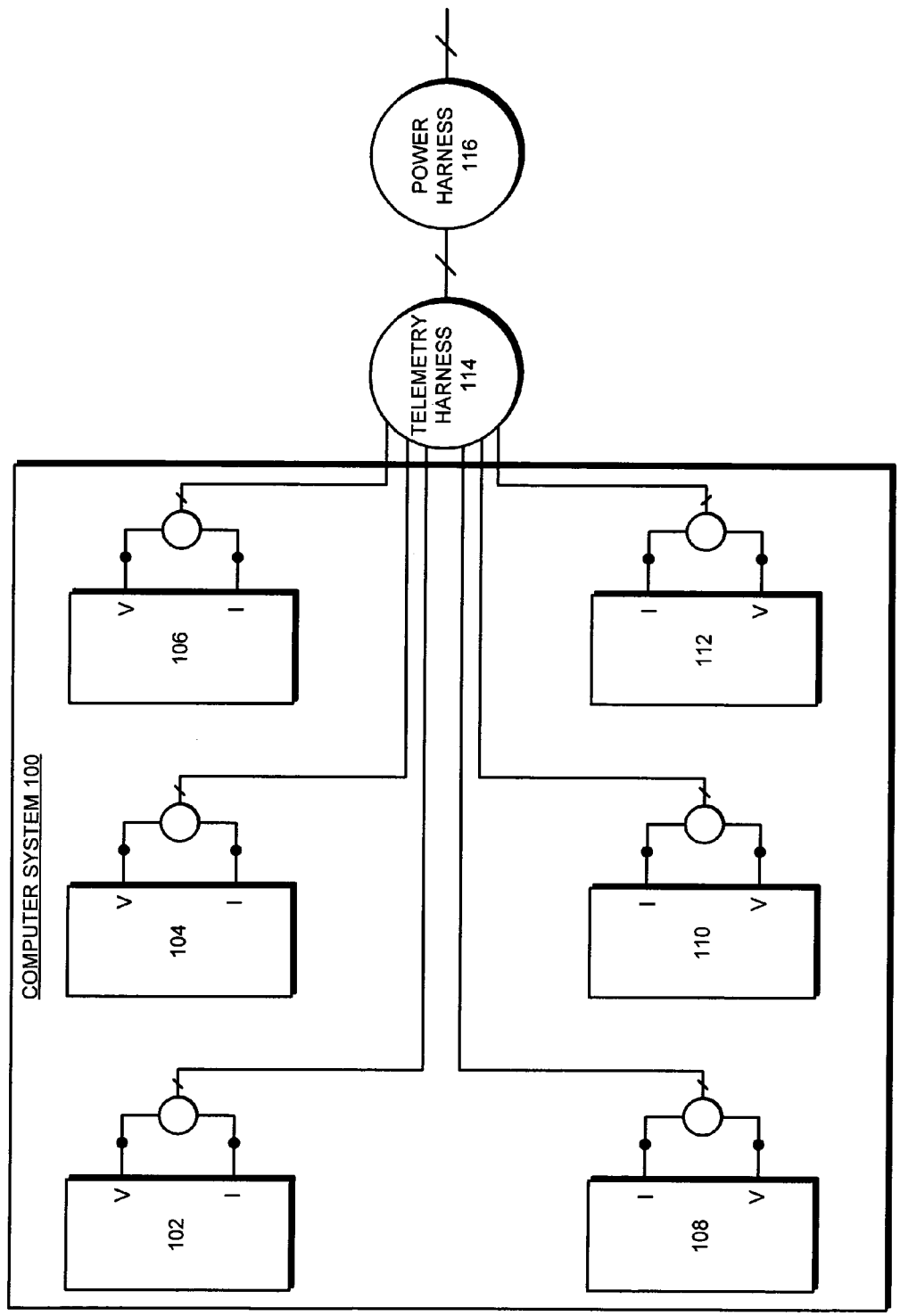
FIG. 1 presents a block diagram of a computer system with a power harness in accordance with an embodiment of the present invention.

FIG. 1 presents a block diagram of computer system 100 with power harness 116 in accordance with an embodiment of the present invention. It also contains sub-components 102-112, and telemetry harness 114.

In one embodiment of the present invention, power harness 116 is a software-based tool that reads time-domain traces of the sensor variables from the telemetry harness and computes the total power consumption based on the time-domain traces of the sensor variables. In a variation on this embodiment, the software-based tool is integrated into the computer system as a software patch.

In one embodiment of the present invention, the sub-components are power supplies within the computer system. In another embodiment of the present invention, the sub-components are field-replaceable units within the computer system.

Telemetry harness 114 is coupled to the sensor outputs in sub-components 102-112. Through these connections, telemetry harness 114 polls and aggregates the sensor variables for these sub-components. In one embodiment of the present invention, telemetry harness 114 measures a voltage and an associated current from sensors in each sub-component within the computer system. Note that the sub-components can report other variables, such as temperature. Also note that the telemetry harness measures sensor variables simultaneously from each sub-component within the computer system.

Presently, computer systems use the sensors within each computer system component in interrupt mode. While operating in interrupt mode, the computer system only receives a value of a sensor variable if the value exceeds a high-threshold value or a low-threshold value, and thereby causes an interrupt to occur.

Presently, computer systems use these sensors to protect the sub-components within the computer system from being damaged. For example, if the temperature in a sub-component exceeds a high-temperature threshold value, the computer system shuts off the sub-component before the sub-component is damaged or does damage to the rest of the computer system.

In contrast, the present invention periodically polls sensors to create a dynamic trace of the sensor variables. In doing so, the system creates a time-domain trace of the sensor variables for each sub-component and uses the time-domain trace to calculate total power consumption for the computer system as a function of time.

Computing Power Consumption

Figure 2:
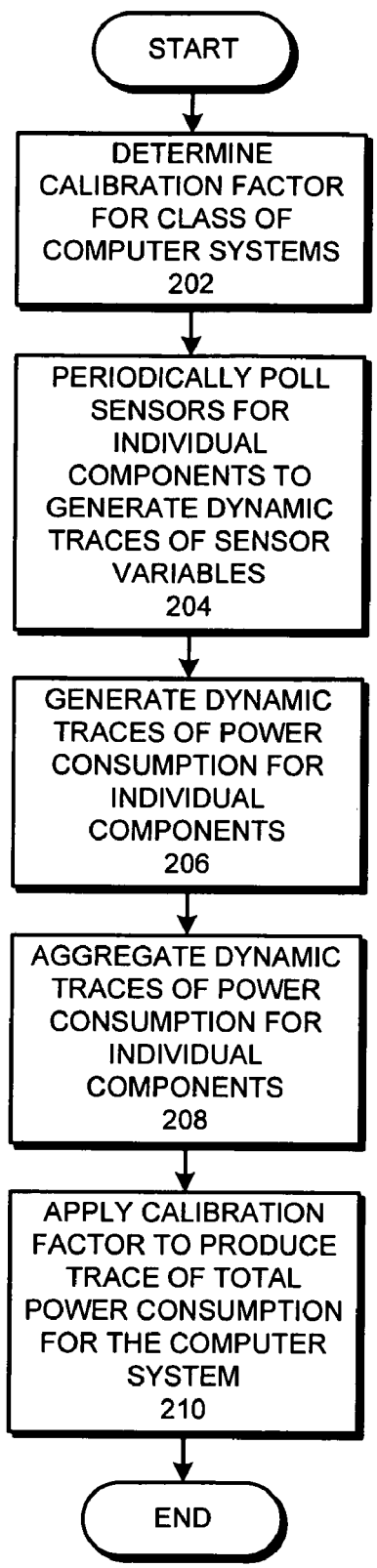
FIG. 2 presents a flow chart illustrating process of computing power consumption in a computer system in accordance with an embodiment of the present invention.

FIG. 2 presents a flow chart illustrating the process of computing power consumption in a computer system in accordance with an embodiment of the present invention. The process begins when the system determines the calibration factor for a given class of computer system (step 202). In doing so, the system calibrates an estimated power consumption computed from dynamic traces of currents and associated voltages with a power consumption directly measured using a hardware power monitor, which accurately measures the power consumption of the computer system.

Note that the system uses the calibration factor to compensate for inaccuracies in the power consumption calculation resulting from biases in the low-accuracy sensors used in the computer system. (Note that system can also use individual calibration factors for each sensor to compensate for these biases in the sensors.)

Also note that the calibration factor for the given class of computer system only needs to be determined once. Since a computer system in a given class of computer systems is typically similar to other computer systems within the given class, the calibration factor for the given class can be applied to any computer system within that given class without having to use a hardware power monitor to recalibrate the sensors.

Next, the system periodically polls sensors for individual components to generate dynamic traces of the sensor variables (step 204). Note that the sensor variables include currents and associated voltages. The system then generates dynamic traces of power consumption for individual components (step 206). It does this by multiplying currents and associated voltages for the individual components within the computer system to produce dynamic traces of power consumption. The system then aggregates the dynamic traces of power consumption for the individual components to produce the dynamic trace for total power consumption in the computer system (step 208). Next, the system applies the calibration factor to the aggregated dynamic trace to produce a dynamic trace of total power consumption for the computer system (step 210).

In one embodiment of the present invention, the system uses historical sensor data to generate a trace of historical power consumption for the computer system.

Generating a Dynamic Power-Flux Map

One embodiment of the present invention generates a dynamic power-flux map for computer systems within a datacenter without performing CFD computations.

In one embodiment of the present invention, the power-flux map is continuously updated as loads on the computer systems change and as the computer systems are upgraded or reconfigured.

One embodiment of the present invention uses a real-time power harness to infer the dynamic power consumption of computer systems within the datacenter.

One embodiment of the present invention is implemented through software which is installed on computer systems within a datacenter. Through continuous system telemetry, the system infers the dynamic power consumption (in watts) for all computer systems within the datacenter. A geometrical mapping of server positions in the datacenter, either through manual tracking of the Cartesian coordinates of server positions, or through use of radio frequency identity and geometry (RFIG) tags is used to substantially eliminate the cost and the complexity of datacenter power-flux distribution audits, which typically require complex CFD computations and only provide a one-time "snapshot" of the power flux across the datacenter.

Figure 3:
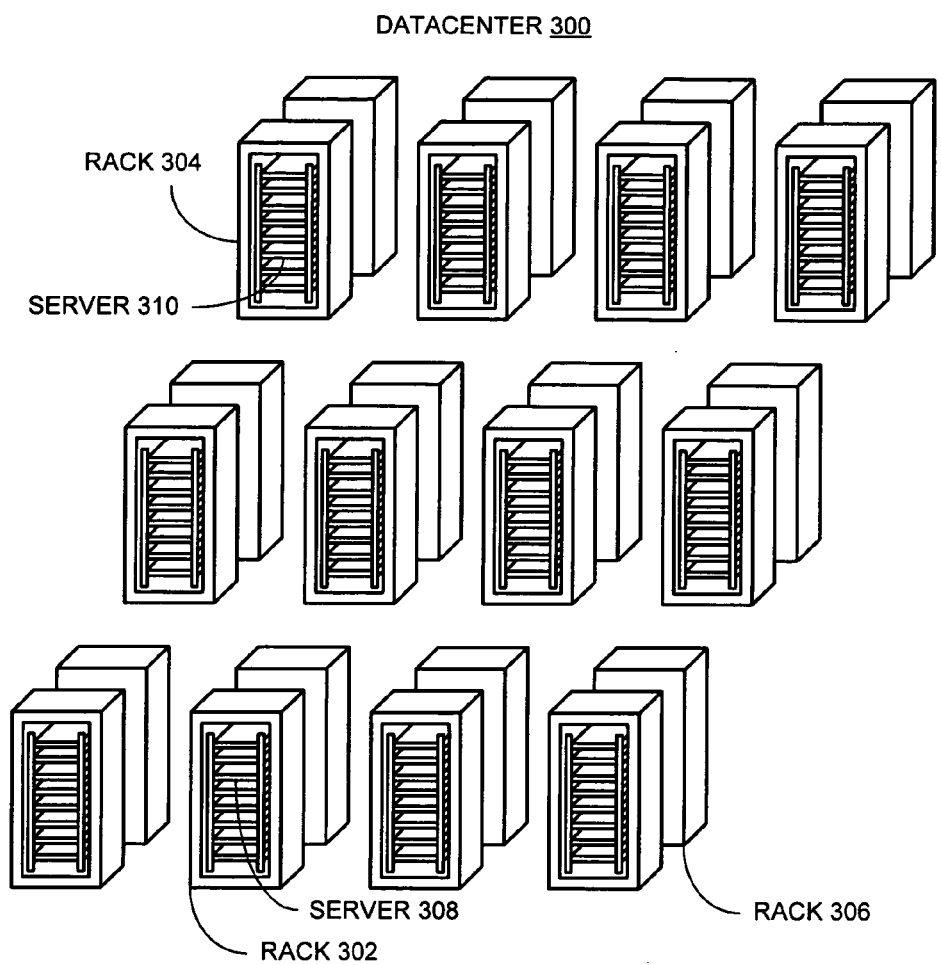
FIG. 3 presents a block diagram of a datacenter in accordance with an embodiment of the present invention.

FIG. 3 presents a block diagram of datacenter 300 in accordance with an embodiment of the present invention. Datacenter 300 contains rows of racks, including racks 302, 304, and 306. Each rack contains a number of computer systems. For example, rack 302 contains a number of computer systems which includes server 308, and rack 304 contains a number of computer systems which includes server 310. As illustrated, in a typical datacenter layout, racks are arranged so that the racks are faced back-to-back. In this configuration, cold air enters from the front of the rack (a "cold aisle") and exhausts to a common "hot aisle" and is vented out of the datacenter.

Figure 4:
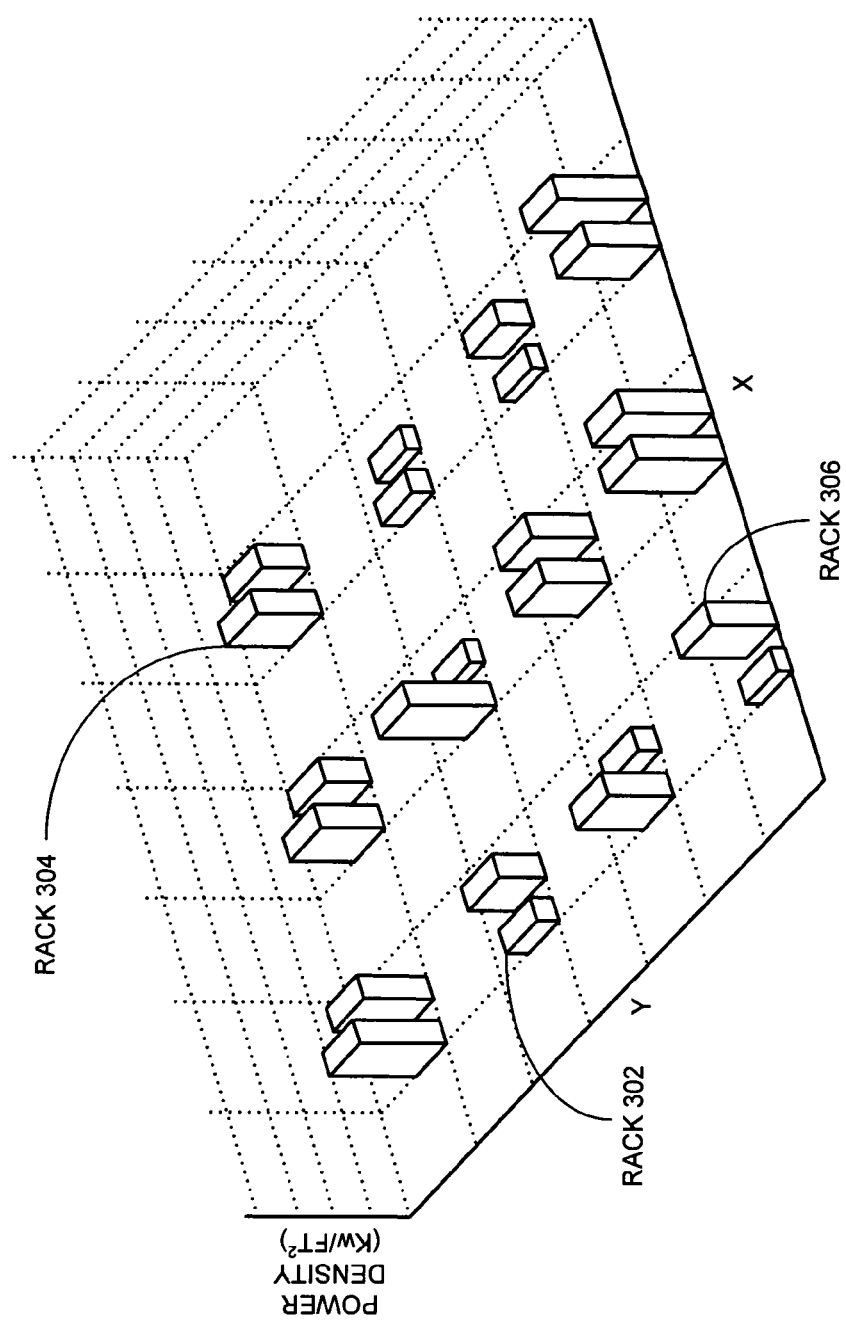
FIG. 4 presents a three-dimensional power-flux map in accordance with an embodiment of the present invention.

When provisioning cooling for a datacenter, a datacenter operator can modify several physical parameters for the datacenter to achieve the thermal management requirements of the datacenter. These physical parameters include, but are not limited to, the number of air conditioning units in the data center, the location of air conditioning units in the data center, the cooling capacity of the air conditioning units in the data center, the location of perforated tiles which vent cool air into the datacenter, the location of racks which house the computer systems in the data center, and the air flow characteristics of the racks in the data center FIG. 4 presents a three-dimensional power-flux map 400 in accordance with an embodiment of the present invention. The three-dimensional power-flux map contains two spatial dimensions which specify locations in a two-dimensional space, and a power density dimension which indicates the power flux at a two-dimensional location. One embodiment of the present invention correlates the dynamic power consumption information obtained from the real-time power harnesses from the computer systems within the datacenter with the (X, Y) location of the computer system within the datacenter to generate the dynamic power-flux map.

In one embodiment of the present invention, the datacenter operator manually tracks the (X, Y) location of the computer system and height (Z) of the computer system within a rack. Note that the height can be measured, for example, based on the position of the lower left front corner of each server or blade in the datacenter.

One embodiment of the present invention uses RFIG tags to automatically determine the location of computer systems within the datacenter.

In FIG. 4, the X and Y axes specify the location of computer systems in a two-dimensional plane within datacenter 300. More specifically, the bar graphs indicate the amount of total dynamic power consumption of a given rack at a given location within the datacenter. For example, the power density for racks 302, 306, and 304 from FIG. 3 are labeled in FIG. 4. Note that the total dynamic power consumption for a given rack is computed by summing the dynamic power consumption reported by the real-time power harnesses for the computer systems within the rack. Also note that the present invention can track individual computer systems not within a rack.

As illustrated in FIG. 4, the power-flux map is not balanced across the datacenter. The datacenter operator can use this power-flux map to determine where to move computer systems in order to substantially balance power flux across the datacenter. For example, after examining the power-flux map, the datacenter operator can determine that moving server 310 into rack 302 helps to balance the power flux across the datacenter.

Figure 5:
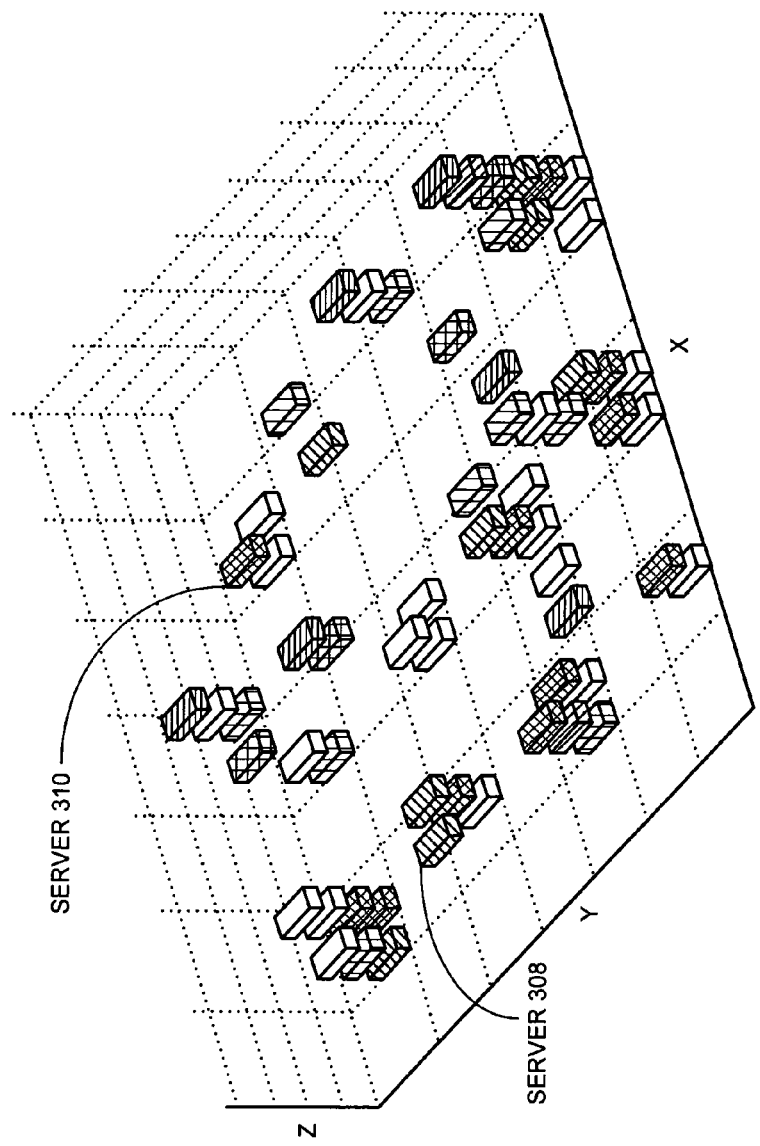
FIG. 5 presents a four-dimensional power-flux map in accordance with an embodiment of the present invention.

FIG. 5 presents a four-dimensional power-flux map 500 in accordance with an embodiment of the present invention. The four-dimensional power-flux map contains three spatial dimensions which specify locations in a three-dimensional space, and a power density dimension which indicates the power flux at a three-dimensional location. One embodiment of the present invention correlates the dynamic power consumption information obtained from the real-time power harnesses from the computer systems within the datacenter with the (X, Y, Z) location of the computer system within the datacenter to generate the dynamic power-flux map.

As discussed in reference to FIG. 4, the datacenter operator can use this power-flux map to determine where to move computer systems in order to substantially balance power flux across the datacenter.

In FIG. 5, the X, Y, and Z axes specify the location of computer systems in a three-dimensional space within datacenter 300. More specifically, each block in the map represents the physical location of a computer system within the datacenter. The shading of the block indicates the amount of dynamic power consumption of a given computer system within the rack as reported by the real-time power harness for the given computer system. For example, the power density for servers 308 and 310 from FIG. 3 are labeled in FIG. 5.

Note that the present invention can also track individual computer systems not within a rack. Also note that the power-flux map can also indicate the absence of power consumption at a given location, corresponding to an absence of a computer system within the rack, or corresponding to a computer system which is not operating at the time when the power-flux map was generated.

In one embodiment of the present invention, the dynamic power-flux map is updated continuously using the continuous power consumption data provided by the real-time power harnesses. In another embodiment of the present invention, the dynamic power-flux map is updated at a specified interval using the power consumption data provided by the real-time power harnesses.

Figure 6:
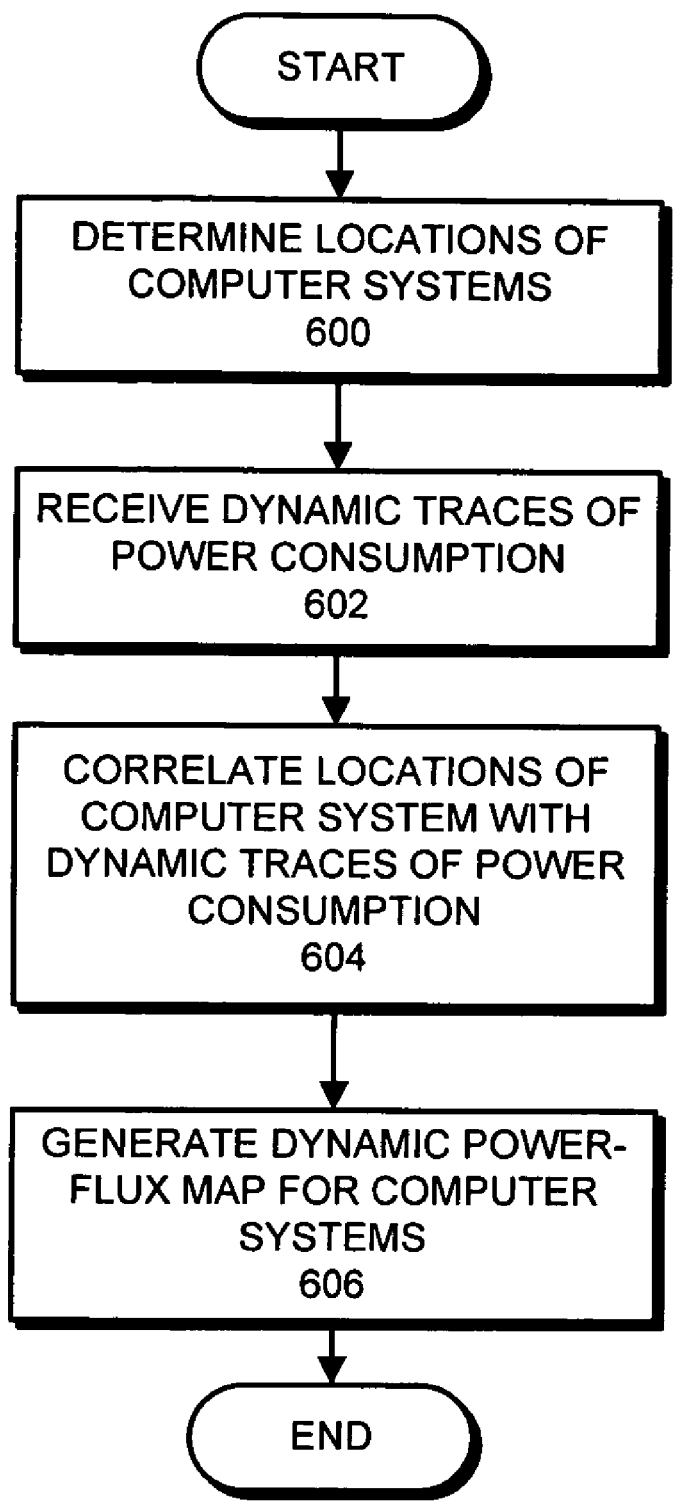
FIG. 6 presents a flow chart illustrating the process of generating a power-flux map in accordance with an embodiment of the present invention.

FIG. 6 presents a flow chart illustrating the process of generating a power-flux map in accordance with an embodiment of the present invention. The process begins when the system determines the locations of the computer systems (step 600). Next, the system receives dynamic traces of power consumption for the computer systems, wherein a dynamic trace of power consumption for a given computer system is generated based on dynamic traces of monitored inferential variables for the given computer system (step 602). The system then correlates the locations of the computer systems with the dynamic traces of power consumption for the computer systems (step 604), and generates the dynamic power-flux map for the set of computer systems based on the correlated locations and the dynamic traces for the computer systems (step 606).

Figure 7:
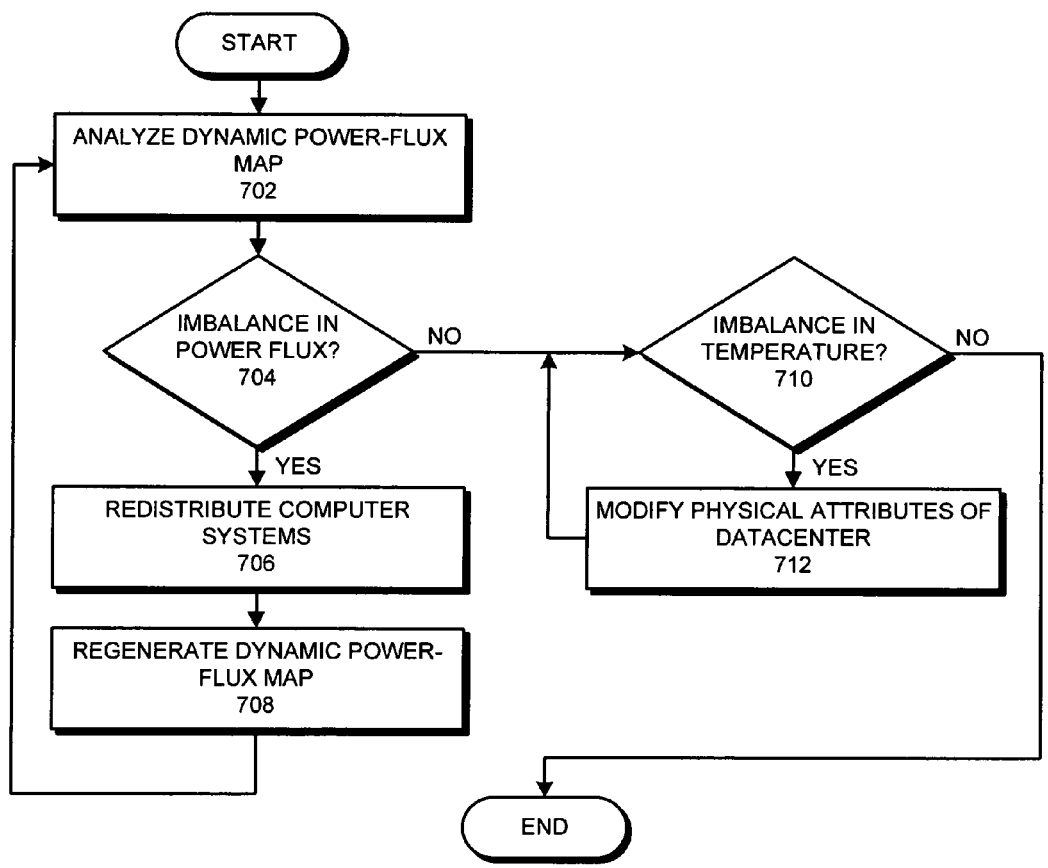
FIG. 7 presents a flow chart illustrating the process of balancing power flux and temperature across a datacenter in accordance with an embodiment of the present invention.

FIG. 7 presents a flow chart illustrating the process of balancing power flux and temperature across a datacenter in accordance with an embodiment of the present invention. The process begins when the system analyzes the dynamic power-flux map to determine whether imbalances exist in power flux across the datacenter (step 702). If imbalances exist, the system redistributes computer systems to substantially balance power flux across the datacenter (steps 704 and 706), and regenerates the dynamic power-flux map for the datacenter (step 708). Note that the system repeats steps 702-708 until the power flux is substantially balanced across the datacenter. In one embodiment of the present invention, the system analyzes the power-flux map in order to determine which computer systems to move to substantially balance power flux across the datacenter.

If the power flux is substantially balanced across the datacenter, the system determines if the temperature across the datacenter is not balanced (step 710). If so, the system modifies physical attributes of the datacenter to substantially balance the temperature across the datacenter until the temperature across the datacenter is substantially balanced (step 712). Note that the system repeats steps 710 and 712 until the temperature is substantially balanced. In one embodiment of the present invention, the system analyzes the power-flux map and the temperature readings within the datacenter in order to determine which computer systems to move to substantially balance temperature across the datacenter.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a dynamic power-flux map for a set of computer systems, comprising:
   determining the locations of the computer systems;
   receiving dynamic traces of power consumption for the computer systems, wherein a dynamic trace of power consumption for a given computer system is generated based on dynamic traces of monitored inferential variables for the given computer system;
   correlating the locations of the computer systems with the dynamic traces of power consumption for the computer systems; and
   generating the dynamic power-flux map for the set of computer systems based on the correlated locations and the dynamic traces for the computer systems.

2. The method of claim 1, wherein the dynamic power-flux map is a three-dimensional map which contains two spatial dimensions which specify locations in a two-dimensional space, and a power density dimension which indicates the power flux at a two-dimensional location.

3. The method of claim 1, wherein the dynamic power-flux map is a four-dimensional map which contains three spatial dimensions which specify locations in a three-dimensional space, and a power density dimension which indicates the power flux at a three-dimensional location.

4. The method of claim 1, wherein determining the location of a computer system involves using a radio frequency identity and geometry (RFIG) tag located on the computer system to automatically detect the location of the computer system.

5. The method of claim 1, wherein the computer systems are located within a datacenter.

6. The method of claim 5, wherein the method further comprises repeating the following process until the power flux across the datacenter is substantially balanced:
  analyzing the dynamic power-flux map to determine whether imbalances exist in power flux across the datacenter; and
  if imbalances exist,
    redistributing computer systems to substantially balance power flux across the datacenter; and
    regenerating the dynamic power-flux map for the datacenter.

7. The method of claim 6, wherein after the power flux across the datacenter is substantially balanced, if the temperature across the datacenter is not balanced, the method further comprises modifying physical attributes of the datacenter to substantially balance the temperature across the datacenter.

8. The method of claim 7, wherein the physical attributes of the datacenter can include:
  the number of air conditioning units in the data center;
  the location of air conditioning units in the data center;
  the cooling capacity of the air conditioning units in the data center;
  the location of perforated tiles which vent cool air into the datacenter;
  the location of racks which house the computer systems in the data center; and
  the air flow characteristics of the racks in the data center.

9. The method of claim 1, wherein the inferential variables include signals from current sensors and voltage sensors located within the computer systems.

10. A computer-readable storage medium storing instructions that when executed by a computer cause the computer to perform a method for generating a dynamic power-flux map for a set of computer systems, wherein the method comprises:
  determining the locations of the computer systems;
  receiving dynamic traces of power consumption for the computer systems, wherein a dynamic trace of power consumption for a given computer system is generated based on dynamic traces of monitored inferential variables for the given computer system;
  correlating the locations of the computer systems with the dynamic traces of power consumption for the computer systems; and
  generating the dynamic power-flux map for the set of computer systems based on the correlated locations and the dynamic traces for the computer systems.

11. The computer-readable storage medium of claim 10, wherein the dynamic power-flux map is a three-dimensional map which contains two spatial dimensions which specify locations in a two-dimensional space, and a power density dimension which indicates the power flux at a two-dimensional location.

12. The computer-readable storage medium of claim 10, wherein the dynamic power-flux map is a four-dimensional map which contains three spatial dimensions which specify locations in a three-dimensional space, and a power density dimension which indicates the power flux at a three-dimensional location.

13. The computer-readable storage medium of claim 10, wherein determining the location of a computer system involves using a radio frequency identity and geometry (RFIG) tag located on the computer system to automatically detect the location of the computer system.

14. The computer-readable storage medium of claim 10, wherein the computer systems are located within a datacenter.

15. The computer-readable storage medium of claim 14, wherein the method further comprises repeating the following process until the power flux across the datacenter is substantially balanced:
  analyzing the dynamic power-flux map to determine whether imbalances exist in power flux across the datacenter; and
  if imbalances exist,
    redistributing computer systems to substantially balance power flux across the datacenter; and
    regenerating the dynamic power-flux map for the datacenter.

16. The computer-readable storage medium of claim 15, wherein after the power flux across the datacenter is substantially balanced, if the temperature across the datacenter is not balanced, the method further comprises modifying physical attributes of the datacenter to substantially balance the temperature across the datacenter.

17. The computer-readable storage medium of claim 16, wherein the physical attributes of the datacenter can include:
  the number of air conditioning units in the data center;
  the location of air conditioning units in the data center;
  the cooling capacity of the air conditioning units in the data center;
  the location of perforated tiles which vent cool air into the datacenter;
  the location of racks which house the computer systems in the data center; and
  the air flow characteristics of the racks in the data center.

18. The computer-readable storage medium of claim 10, wherein the inferential variables include signals from current sensors and voltage sensors located within the computer systems.

19. An apparatus that generates a dynamic power-flux map for a set of computer systems, comprising:
  a location-determination mechanism configured to determine the locations of the computer systems;
  a receiving mechanism configured to receive dynamic traces of power consumption for the computer systems, wherein a dynamic trace of power consumption for a given computer system is generated based on dynamic traces of monitored inferential variables for the given computer system;
  a correlation mechanism configured to correlate the locations of the computer systems with the dynamic traces of power consumption for the computer systems; and
  a map-generation mechanism configured to generate the dynamic power-flux map for the set of computer systems based on the correlated locations and the dynamic traces for the computer systems.

20. The method of claim 19, wherein the dynamic power-flux map is a three-dimensional map which contains two spatial dimensions which specify locations in a two-dimensional space, and a power density dimension which indicates the power flux at a two-dimensional location.

* * * * *